3,590,117
LONG-LASTING TROCHE CONTAINING GUAR GUM
George L. Christenson, Cincinnati, and Harold E. Huber, Goshen, Ohio, assignors to Richardson-Merrell Inc., New York, N.Y.
No Drawing. Filed Mar. 24, 1969, Ser. No. 810,011
Int. Cl. A61j *3/06, 3/10;* A61k *27/12*
U.S. Cl. 424—19                                1 Claim

ABSTRACT OF THE DISCLOSURE

A compressed powder, long-lasting, troche containing 3% to 6% of guar gum, 15% to 85% of dry skim milk powder and at least 9% of a water-soluble pharmaceutically acceptable tabletting diluent.

---

This invention relates to long-lasting troches or pastilles. According to this invention, troches are prepared which provide a vehicle for various medicaments used in treating the oral cavity or for sublingual or transbuccal administration lasting for periods of one-half hour to eight hours or more, and preferably for at least one or two hours.

In attempts by the applicants to prepare a compressed long-lasting troche that would serve as a vehicle for medicaments, a number of different ingredients and techniques were tried. Various quantities of high viscosity gums such as hydroxypropyl methylcellulose, e.g., having a viscosity of 15,000 cps. for a 2% aqueous solution at 20° C., were tried. However, the troche was not esthetically acceptable in that the troche would "flake-off" in the mouth rather than dissolve uniformly. The applicants then tried using low viscosity hydroxypropyl methylcellulose. The resultant troches dissolved uniformly over a prolonged period; however, the saliva produced in the mouth was extremely viscous and adhesive to the point where some persons experienced a gagging response after five minutes or more. Various gum levels, types and viscosity grades of hydroxypropyl methylcellulose were tried in an effort to overcome these objectionable facets. It was found that when the gum levels were reduced to avoid the gagging response the dissolution time dropped off markedly, whereas the high viscosity grades produced a troche which would "flake-off" when used in quantities sufficient to attain a long dissolution time. Other high viscosity gums, e.g., guar gum, which is used in this invention, at concentrations sufficient to provide a long troche dissolution time, e.g., in excess of 10% guar gum, would elicit the gagging response after 5 minutes or more.

Troches made with proteins such as sodium caseinate or other proteins also have a number of shortcomings. Thus, when the quantity of sodium caseinate is in excess of about 75%, the troches are difficult to formulate and are softer than desirable. Mixtures containing in excess of about 90% protein either would not compress or, if a troche were able to be formed, it was extremely friable and would break apart with light pressure, e.g., less than 1 kg. hardness on a Pfizer hardness tester. Furthermore, a troche containing 68% of sodium caseinate plus other ingredients of the troches of this invention but without guar gum had a dissolution time of only 31 minutes. Dry skim milk powder, containing approximately 36% protein, was found to be more suitable for compression into troches; however, 35% or more was required in a troche to achieve a dissolution time of 33 minutes or longer. A maximum dissolution time of 245 minutes was able to be achieved with a troche containing 98% dry skim milk powder and 2% magnesium stearate lubricant. Troches requiring such a large amount of dry skim milk powder would severely limit the amount of drug substances able to be incorporated. The size of the troche would also necessarily be quite large, approximately 1.5 grams or more to achieve a dissolution time of 33 minutes or longer.

The applicants' work has shown that variations of the gum concentration will increase or reduce total dissolution time of troches; however, those troches with a sufficiently long dissolution time do not exhibit acceptable esthetic properties and either "flake-off" during dissolution or provide an unacceptably viscous saliva that, in some persons, stimulated a gagging reflex. After further experimentation with numerous formulations, it was discovered that variation of the percent protein or protein containing powder in the troche would also serve to extend or shorten total dissolution time. It was further discovered that small amounts of gum could be added to a protein troche formulation to further prolong total dissolution time without obtaining the undesirable properties noted with higher gum levels.

It has now been found that a troche containing dry skim milk powder and guar gum has a long-lasting dissolution time together with uniform dissolution without the objectionable features of the above discussed formulations. Experiments have shown that the addition of guar gum to various levels of dry skim milk powder resulted in a two to three-fold increase in total dissolution time. Generally, the dissolution time is dependent on the percentage of dry skim milk powder incorporated in the troche, i.e., the dissolution time is longer when a larger percentage of dry skim milk powder is in the troche. If was further found, however, that a relatively small amount of guar gum synergistically increases the troche dissolution time by an amount greater than the sum of dissolution times for troches made with corresponding levels of the guar gum and no dry skim milk powder, or dry skim milk powder and no guar gum. The hardness of such troches is within a desirable level and in excess of 4 kg. as measured on a Pfizer hardness tester.

The troches of this invention contain from about 3% to 6% of guar gum and from about 15% to 85% of dry skim milk powder and preferably from about 4% to 6% of guar gum and about 30% to 75% of dry skim milk powder. The remainder of the troche can be a conventional water-soluble tablet diluent or base, preferably including minor quantities of a medicament and conventional pharmaceutical tabletting excipients such as lubricants, dyes and flavoring agents. The guar gum, dry skim milk powder, and the water-soluble tablet diluent are in finely divided powdery form, which is compressed into a troche.

The compressed troches of this invention can be made by either wet or dry granulation methods. Heat or moisture labile compounds can thus be included in the formulations and handled in a manner to maintain the compounds' integrity. The bland powders used as the troche matrix are readily flavored with a wide variety of fragranes to meet the widely varying products needs.

The drugs or medicaments used in the troche are preferably those which are useful in treating the oral cavity or which have utility by sublingual or transbuccal administration. The medicament can be in powdered form or it can be absorbed on the various powdered ingredients of the troche. Examples of drug substances that may be suited for use in these troches are as follows: antiseptics such as thymol, phenol, cresols, guaiacol, eugenol, hexachlorophene; quaternary ammonium compounds such as cetylpyridinium chloride; iodoforms and benzoic acid and its derivatives; antibiotics such as tetracyclines, nystatin, amphotericin B, erythromycin, bacitracin, neomycin, and tyrothricin; corticosteroids such as triamcinolone acetonide, testosterone, cortisone, hydrocortisone; anesthetics such as diperodon, butacaine sulfate, dibucains HCl, dyconine HCl, and benzocaine; fluorides such as sodium fluoride and stannous fluoride; oxygenating agents such as potassium peroxymonosulfate and urea peroxide; anti-spasmodics and anti-nauseants such as dicyclomine,, atropine, homatropine and scopolamine; vitamins such as vitamin A, pyridoxine, ascorbic acid and niacin; anorexics such as diethylpropion, dextroamphetamine, and phentermine; blood clearing and regulating agents such as heparin; and enzymes such as lipase. The quantity of medicament in the troche can vary over a wide range. Generally, the quantity of medicament will vary from about 0.05% to 15% of the troche and preferably from 0.2 to 5% thereof. The exact amount of medicament will vary over a wide range depending on the pharmacokinetic and biopharmaceutical properties thereof.

Troches or pastilles are also referred to as lozenges, and when cylindrical or rod shaped as bacillules. The shape of the troche may be varied according to the use intended. It may be in the form of a large round tablet, a square of the lozenge type, a ball such as the familiar candy "jawbreakers" or capsule shaped.

The medicament can be admixed with the other ingredients prior to either wet granulation or slugging, or with the lubricant just prior to compression.

The tabletting diluent or base is a water-soluble palatable excipient such as a disaccharide or water-soluble hexahydric saturated aliphatic alcohol. Illustrative of suitable diluents there can be mentioned sucrose, lactose, maltose, isomaltose, trehalose, sorbitol, mannitol, mixtures of the foregoing, and the like. The preferred diluent is mannitol. Apart from the guar gum and dry skim milk powder, the remainder of the troche will contain the diluent, preferably with a small quantity of medicament and tabletting excipients such as lubricants and flavor. The quantity of diluent is at least 9% by weight of the troche. The quantity of diluent can vary from about 9% to 82% by weight of the troche and preferably from about 20% to 66% by weight of the troche.

The pharmaceutical tabletting lubricant is generally finely divided and screened through an 80 or 100 mesh (U.S. Series) screen. The amount of lubricant can vary as is conventional in the art, from about 0.1% to 8% but usually from about 0.4% to 4% by weight of the troche. Illustrative of suitable lubricants, there can be mentioned hydrogenated vegetable oil, stearic acid, magnesium stearate, calcium stearate, white mineral oil, talc, sodium benzoate, sodium chloride, polyethylene glycols such as the Carbowax products manufactured by Union Carbide Chemical Company, and the like.

These troches can be made by either wet or dry granulation methods, depending on the lability of the ingredients. Thus, the ingredients at some stage of their processing are in a powdered or finely divided form as is conventional in the manufacture of tablets or troches by the wet or dry granulation methods, e.g., in a powdered form passing through the U.S. Standard Screen Mesh size of 10 or finer. Such methods, together with various particle sizes of the ingredients or mixture thereof, are described in Remington's Pharmaceutical Sciences, 13th edition, pages 568–572 (1965). Troches made by both the wet or dry granulation methods gave approximately the same in vitro dissolution times. However, in general, troches made by wet granulation methods are harder and do not break as readily when dissolved in the mouth.

Guar gum is a well known natural non-ionic, neutral galactomannan polysaccharide derived from the seed of the guar plant, *Cyamopsis tetragonolobus*, family Leguminosa. A preferred guar gum for use in this invention has viscosities ranging from 2,000 to 3,500 cps. (1% dispersion in water at 25° C.). Illustrative of gaur gum is guar flour sold by T. M. Duche and Sone or Meer Corporation, and Jaguar B20A from Stein Hall Company. A description of guar gum can be found on pages 321–341 of Whistler, Industrial Gums, Academic Press (1959), particularly on pages 323–324, which describes food grade guar gum.

Dry skim milk powder is a well known material which is also referred to simply as skim milk powder. It is prepared by spray drying of skim milk. Generally, such powder contains approximately 36% protein, 52% lactose, 8% ash, and 4% total moisture. Illustrative of dry skim milk powder is the product Carnation Instant Nonfat Dry Milk. Such skim milk powders are described in Pat. No. 2,835,586. Also, Agglomerated Instant Non-fat Dry Milk from Land O'Lakes Creameries, Inc. is another commercial dry skim milk powder.

Unless otherwise described, perecentages given herein are on a weight basis.

The following examples are illustrative of the invention.

EXAMPLE 1

A

| | 500 troches, gms. |
|---|---|
| Guar gum (4%) | 35.0 |
| Dry skim milk powder (17%) | 148.0 |
| Hydrocortisone | 0.5 |
| Cortisone | 0.5 |
| Cetylpyridinium chloride | 2.5 |
| Mannitol | 614.8 |

(B)

| | |
|---|---|
| Flavor | 8.7 |
| Talc | 30.0 |
| Carbowax 6000 | 30.0 |

Directions: Mix A powders in a suitable mixer and add sufficient deionized water to make a wet granulation. Dry the granulation in an oven at 120° F. to between 2 and 4% moisture. Pass the dried granulation through a No. 12 screen on an oscillator. Add B powders and mix well. Compress the mixture on a Stokes or suitable tabletting machine at approximately 4000 p.s.i. into 1.74 gm. troches with ¾ inch flat faced beveled punches.

EXAMPLE 2

A

| | 500 troches, gms. |
|---|---|
| Guar gum powder (4%) | 35.0 |
| Dry skim milk powder (34%) | 296.0 |
| Mannitol | 465.3 |
| Cetylpyridinium chloride | 2.5 |

B

| | |
|---|---|
| Flavor | 8.7 |
| Benzocaine | 2.5 |
| Talc | 30.0 |
| Carbowax 6000 | 30.0 |

Directions: Mix A powders in a suitable mixer and add sufficient deionized water to make a wet granulation. Dry the granulation in an oven at 120° F. to between 2 and 4% moisture. Pass the dried granules through a No. 12 screen on an oscillator and add B powders. Mix well and compress on a Stokes or suitable tabletting machine at approximately 4000 p.s.i. into 1.74 gm. troches with ¾ inch flat faced beveled punches.

taining only the dry skim milk powder or guar gum, as indicated, together with the filler, dye, and lubricant.

TABLE I

|  | Percent DSMP [1] | | | | | | |
|---|---|---|---|---|---|---|---|
|  | 0 | 17 | | 34 | | 68 | |
|  | Obs. | Obs. | Ant.[2] | Obs. | Ant.[2] | Obs. | Ant.[2] |
| 0% guar gum | | (14) | | (33) | | (110) | |
| 17% guar gum | (480+) | 480+ | | 480+ | | 480+ | |
| 8.5% guar gum | (420) | 420 | 434 | 450+ | 453 | 450+ | 530 |
| 4% guar gum | (17) | 80 | 31 | 157 | 50 | 378 | 127 |

[1] Dry skim milk powder.
[2] Ant. is the anticipated dissolution time i.e., the sum of the observed dissolution times for troches containing dry skim milk powder without guar gum and troches containing guar gum without dry skim milk powder.

EXAMPLE 3

500 troches, gms.

A
| | |
|---|---|
| Guar gum powder (4%) | 10.0 |
| Dry skim milk powder (68%) | 170.0 |
| Sodium chloride | 5.6 |
| Cetylpyridinium chloride | 1.25 |
| Mannitol | 41.25 |

B
| | |
|---|---|
| Flavor | 2.5 |
| Potassium peroxymonosulfate | 1.9 |
| Talc | 8.75 |
| Carbowax 6000 | 8.75 |

Directions: Mix A powders in a suitable mixer and add sufficient deionized water to make a wet granulation. Dry the granulation in an oven at 120° F. to approximately 2% misture. Pass the dried granules through a No. 12 screen on an oscillator and add B powders. Mix well and compress on a Stokes or suitable tabletting machine at approximately 4000 p.s.i. into 500 mg. troches with 7/16 inch flat faced beveled punches.

EXAMPLE 4

This example together with the following Table I shows the synergistic increase of dissolution time of troches containing guar gum and dry skim milk powder.

The troches used in these studies contained only the specified quantities of guar gum, or dry skim milk powder, or a mixture of guar gum and dry skim milk powder, with the remainder of the troche in each instance being composed of mannitol filler, 2% of magnesium stearate lubricant and a yellow dye. Troches were made with guar gum without dry skim milk powder, as well as with dry skim milk powder, without the guar gum in order to determine the influence of such ingredients on prolongation of troche dissolution. The same quantities and percents of guar gum and dry skim milk powder were then combined into troches and the resultant dissolution times noted. Dissolution times were determined with the National Formulary XII apparatus suggested for evaluation of long-lasting dosage forms, and described on page 15 of the Second Supplement thereof. The procedure, however, was modified in that deionized water was used as the dissolution fluid and the troches were allowed to remain in the same fluid until approximately 8 hours had elapsed, or the troche was dissolved. Total time in minutes was noted for a minimum of three troches and their average time recorded in Table I. The results of this experiment are shown in Table I. The numbers under the headings—Obs. (Observed) and Ant. (Anticipated)—are in minutes. The numbers in parenthesis refer to the dissolution time of troches con- Preferred troches of this invention contain at least 85%, by weight, of guar gum, dry skim milk powder and the diluent and particularly at least 90% by weight of such ingredients.

What is claimed is:

1. A long-lasting, compressed powder, troche comprising:
 (A) 3% to 6% of guar gum;
 (B) 15% to 85% of dry skim milk powder;
 (C) 9% to 82% of a water-soluble pharmaceutical tabletting diluent selected from the group consisting of disaccharides and hexahydric saturated aliphatic alcohols;
 (D) 0.05% to 15% a dosage amount of an oral cavity-treating or a sublingually or transbuccally administered medicament;
 (E) 0.1% to 8% of a pharmaceutically acceptable tabletting lubricant; and
 (F) wherein at least 85% of said troche is composed of said guar gum, dry skim milk powder and diluent.

References Cited

UNITED STATES PATENTS

| | | | |
|---|---|---|---|
| 2,406,741 | 9/1946 | Compton et al. | 424—359UX |
| 2,519,487 | 8/1950 | Macek | 424—359UX |
| 2,774,710 | 12/1956 | Thompson et al. | 424—363UX |
| 2,970,942 | 2/1961 | Halpern | 424—363UX |
| 3,145,146 | 8/1964 | Lieberman et al. | 424—361X |
| 3,243,347 | 3/1966 | Kracauer | 424—359X |
| 3,312,594 | 4/1967 | Cyr et al. | 424—361X |
| 3,313,800 | 4/1967 | Jackson et al. | 424—363UX |
| 3,341,415 | 9/1967 | Scott | 424—361X |
| 3,427,378 | 2/1969 | Henderson et al. | 424—19X |

FOREIGN PATENTS

| | | |
|---|---|---|
| CAM87 | 8/1965 | France. |
| 1,477,633 | 4/1967 | France. |

OTHER REFERENCES

Wosika, R. H.: Am. J. Med. Sci. 195:676–682 (1938), "Control of Gastric Acidity in Peptic Ulcer by Alkalinized Powdered Skim Milk Tablets."

Eatherton, L. E. et al.: Drug, Standards 23:42–7 (1955), "Guar Gum as a Binder and Disintegrator for Certain Compressed Tablets."

SHEP K. ROSE, Primary Examiner

U.S. Cl. X.R.

424—22, 359, 361, 363